Patented July 13, 1937

2,087,162

UNITED STATES PATENT OFFICE 2,087,162

PERSPIRATION-INHIBITING COMPOSITION

William C. Moore, Stamford, Conn., assignor to U. S. Industrial Alcohol Co., New York, N. Y., a corporation of West Virginia No Drawing. Application November 25, 1935, Serial No. 51,480

9 Claims. (Cl. 167—90)

This invention is concerned with a solidified, predominantly alcoholic composition containing an astringent salt having a perspiration-inhibiting property such as that possessed by aluminum chloride and zinc chloride.

The object of the invention is to provide a composition which is of smooth, salve-like consistency, has good penetrating properties and dries quickly on the skin, and in which the astringent salt does not suffer any serious deterioration.

I have found that one or more waxes, preferably the harder waxes such as candelilla, carnauba and beeswax, are advantageous solidifying agents for alcoholic solutions of the astringent salt, except that as a hot solution, containing only the alcohol (concentrated or diluted somewhat with water), the astringent, and the wax, cools and solidifies, segregation occurs to a greater or less extent. That is to say, the wax tends to form lumps or aggregates which are harder than the main mass of the material, and these lumps or granular portions cause the preparation to have a rough, sandy feeling when it is rubbed on the skin.

I have now discovered that the higher fatty acids, such as have ten to twenty carbon atoms, possess to a remarkable degree a property of inhibiting granulation in the solidified alcoholic-wax-astringent preparations to which the invention relates. The same effect can be had with esters of these same fatty acids which are derived from alcohols, either monohydric or polyhydric, having from two to four carbon atoms, or with natural oil or fat materials containing such esters. The materials of this general category which are suitable for the purposes of the invention act as modifiers to prevent or reduce graininess in the solid or semi-solid anti-perspiration compositions. Thus, I have employed lauric, myristic, palmitic, stearic and oleic acids, ethyl stearate, butyl stearate, glycol stearate, glycol oleate, mutton tallow and coconut oil to accomplish the desired result.

Another beneficial effect of such modifiers is that they substantially eliminate the harsh sensation which might result from a residual wax film on the skin. These modifiers are not in themselves capable of solidifying the alcoholic solutions of astringent salts which I employ, but rather strangely, despite the fact that they are, in general, more soluble in these solutions than are the waxes used as solidifiers, the modifiers have the desirable effect of increasing the rigidity of the solidified compositions.

The general method of making the new compositions is to heat the mixture under a reflux condenser until solution of substantially all ingredients is effected, and then run the mixture into containers, with or without stirring.

The alcohol, which constitutes a large or major portion of the composition, may be ethyl alcohol, or its equivalent for topical use, propyl alcohol, either normal or isopropyl, or mixtures of the equivalent alcohols. Where ethyl alcohol is used it may be denatured according to some government formula approved for topical use.

The typical astringent salt used to control perspiration is aluminum chloride, and this may be employed in either the hydrated or the anhydrous form in compositions of this invention. Zinc chloride is also effective.

The following examples illustrate how the invention has been carried out in practice.

*Example 1.*—22.5 gms. of aluminum chloride, hydrated, ($AlCl_3.6H_2O$) 12.0 gms. of candelilla wax and 16.0 gms. of stearic acid were boiled under a reflux condenser with an alcoholic menstruum consisting of 108 cc. of anhydrous ethyl alcohol, denatured according to U. S. Government formula, and 108 cc. of isopropyl alcohol (98% by volume). When solution of the solid ingredients had been effected, 0.7 cc. of perfume base was added and the mixture was run off into small containers. When cold it formed a solid mass of smooth salve-like consistency, small portions of which could be removed in discrete quantities from the container, by means of the fingers, and applied to the human skin, as under the arms, to control or deodorize perspiration.

A similar preparation, made without the stearic acid, was decidedly inferior to that described in Example 1 in that it contained many granular, sandy particles which had an abrasive "feel" when rubbed into the skin, and, moreover, was much more susceptible to mechanical shock. When examined under a microscope with a magnification of about 100 diameters, the composition containing stearic acid was found to be substantially free from the waxy aggregates which a similar inspection showed to be abundant in the mixture from which the acid was omitted.

*Example 2.*—12.4 gms. of anhydrous aluminum chloride was added in small quantities at a time to a cold mixture consisting of 12.0 gms. of candelilla wax, 16 gms. of stearic acid, 108 cc. of anhydrous ethyl alcohol, denatured according to U. S. Government formula, and 117 cc. of isopropyl alcohol (91% by volume concentration of isopropanol). This mixture was then heated under a reflux condenser, and the preparation completed as in Example 1. The final composition was substantially the same as that of Example 1 in appearance, chemical constituents and general properties.

*Example 3.*—22.5 gms. of anhydrous zinc chloride, 12.0 gms. of candelilla wax, 16 gms. stearic acid, 108 cc. of absolute ethyl alcohol and 108 cc. of (98% by volume) isopropyl alcohol were boiled under a reflux condenser until solution was effected. 0.7 cc. of perfume base was then added, and the composition poured into containers. When cold it formed a firm, solid mass of highly astringent properties, suitable for controlling perspiration.

*Example 4.*—Like Example 1, except that 16.0 gms. of lauric acid was used instead of the same amount of stearic acid.

*Example 5.*—Like Example 1, except that 16.0 gms. of myristic acid was used instead of the same amount of stearic acid.

*Example 6.*—Like Example 1, except that 16.0 gms. of palmitic acid was used instead of the same amount of stearic acid.

*Example 7.*—Like Example 1, except that 16.0 gms. of oleic acid was used instead of the same amount of stearic acid.

*Example 8.*—Like Example 1, except that 16.0 gms. of ethyl stearate was used instead of the same amount of stearic acid.

*Example 9.*—Like Example 1, except that 16.0 gms. of glycol stearate was used instead of the same amount of stearic acid.

*Example 10.*—Like Example 1, except that 16.0 gms. of glycol oleate was used instead of the same amount of stearic acid.

*Example 11.*—Like Example 1, except that 16.0 gms. of coconut oil was used instead of the same amount of stearic acid.

*Example 12.*—Like Example 1, except that 16.0 gms. of mutton tallow was used instead of the same amount of stearic acid, and 12.0 gms. of carnauba wax instead of 12.0 gms. candelilla wax.

*Example 13.*—Like Example 12, except that 16.0 gms. of coconut oil was used instead of the same amount of mutton tallow.

*Example 14.*—Like Example 1, except that 16.0 gms. of butyl stearate was used instead of the same amount of stearic acid.

All of these examples in general possess properties similar to those of Example 1. Example 12, however, was somewhat inferior to the others in that it was slightly "grainy".

*Example 15.*—Like Example 1, except that 216 cc. of absolute ethyl alcohol was used instead of a mixture of ethyl and isopropyl alcohols. The resultant solid was hard and firm but was slightly more granular than Example 1.

*Example 16.*—22.5 gms. aluminum chloride ($AlCl_3.6H_2O$), 12.0 gms. candelilla wax and 16.0 gms. stearic acid were boiled for more than an hour under a reflux condenser with 216 cc. of normal propyl alcohol (substantially 98% by weight). The aluminum chloride did not all dissolve, so 10 cc. water was added. In a few minutes all was in solution. 0.7 cc. of perfume base was added, after which the mixture was run into containers to cool. When it had become solid this product was found to be firm, hard, nearly white and non-granular.

*Example 17.*—Previous experiments showed that aluminum chloride has a lower solubility in isopropyl alcohol than in ethyl alcohol. Example 17 was therefore made up like Example 1, except that the solvent used was 206 cc. of 98% isopropyl alcohol and 10 cc. water. The resultant solid alcoholic preparation was of very fine quality, being non-granular, firm and hard. If the stearic acid is omitted, the product contains many granules.

Instead of candelilla wax, other waxes may be used. I have obtained particularly good results by substituting an equal weight of carnauba wax, or of beeswax, for the 12 gms. of candelilla used in Examples 1 and 2. If carnauba wax is used, the product has a flow point somewhat higher (65° C. vs. 58–59 C.) than has the candelilla material.

The use of carnauba and of beeswax results in compositions having somewhat lower mechanical rigidity than is obtained with candelilla wax. These waxes are, therefore, suitable for use when it is wished to dispense compositions made according to this invention in a pasty form, or when it is desired to use collapsible tubes as containers.

Spermaceti and Chinese insect wax have also been used instead of candelilla in compositions of the type of Examples 1 and 2. In both cases the products consisted of a semi-solid felted mass of crystalline material. By increasing the solid content a better composition may be obtained, but these individual crystalline waxes in general are not as completely suitable for the preparation of solid alcoholic deodorants as are candelilla, carnauba and beeswax.

While I have described a number of variations of this invention I prefer to carry it out as described in Examples 1 and 2. The use of candelilla wax instead of the other waxes mentioned gives a product light in color, with a reasonably high flow point and a resistance to mechanical shock far above that provided by carnauba or beeswax. The use of stearic acid eliminates the undesirable graininess, or segregation which occurs when no modifier is used, and contributes a desirable unctuousness or smoothness to the finished product which is lacking when the modifier is omitted. These two desirable effects are attained, to a higher degree at a reasonable cost with stearic acid than with any of the other modifiers. Glycol stearate, and myristic acid produce the same effects to almost the same degree but at a much greater cost.

Coconut oil with candelilla wax (Example 11) is also an excellent "modifier", though compositions made according to Example 11 are slightly more grainy than those made according to Examples 1 and 2. However, if carnauba wax is used, the best all round preparation containing that particular wax is Example 13 in which coconut oil is the modifying agent.

The novel feature of this invention is the use of simple fatty acids, and their relatively simple esters, to eliminate graininess, reduce the harshness of the residual wax film left on the skin, and increase mechanical rigidity of solid alcoholic compositions containing wax as a solidifier and an astringent salt to control, inhibit and deodorize perspiration.

It is, of course, understood that tinting or pigmenting materials may be added to compositions of the type disclosed herein without departing from the spirit of the invention.

I claim:

1. A solid or semi-solid composition for topical use, containing an astringent salt selected from the group consisting of aluminum chloride and zinc chloride, wax, a predominant amount of alcohol, and a modifier selected from the group consisting of the higher fatty acids and their esters of alcohols having two to four carbon atoms, said modifier having the property of inhibiting granulation of the wax.

2. A solid or semi-solid composition for topical use, containing an astringent salt selected from the group consisting of aluminum chloride and zinc chloride, wax, a predominant amount of alcohol, and stearic acid as a modifier to inhibit granulation of the wax.

3. A solid or semi-solid composition for topical use, containing aluminum chloride, wax, a predominant amount of alcohol, and a modifier selected from the group consisting of the higher fatty acids and their esters of alcohols having two to four carbon atoms, said modifier having the property of inhibiting granulation of the wax.

4. A solid or semi-solid composition for topical use, containing zinc chloride, wax, a predominant amount of alcohol, and a modifier selected from the group consisting of the higher fatty acids and their esters of alcohols having two to four carbon atoms, said modifier having the property of inhibiting granulation of the wax.

5. A solid or semi-solid composition for topical use, containing an astringent salt selected from the group consisting of aluminum chloride and zinc chloride, candelilla wax, a predominant amount of alcohol, and a modifier selected from the group consisting of the higher fatty acids and their esters of alcohols having two to four carbon atoms, said modifier having the property of inhibiting granulation of the wax.

6. A solid or semi-solid composition for topical use, containing an astringent salt selected from the group consisting of aluminum chloride and zinc chloride, candelilla wax, a predominant amount of alcohol, and stearic acid as a modifier to inhibit granulation of the candelilla wax.

7. A solid or semi-solid composition for topical use, containing aluminum chloride, wax, a predominant amount of alcohol, and stearic acid as a modifier to inhibit granulation of the wax.

8. A solid or semi-solid composition for topical use, containing aluminum chloride, candelilla wax, a predominant amount of alcohol, and stearic acid as a modifier to inhibit granulation of the candelilla wax.

9. A solid or semi-solid composition for topical use, containing an astringent salt selected from the group consisting of aluminum chloride and zinc chloride, wax, a predominant amount of alcohol, and a natural fatty material containing a substance from the group consisting of the higher fatty acids and their esters of alcohols having two to four carbon atoms, said substance having the property of inhibiting granulation of the wax.

WILLIAM C. MOORE.